(12) United States Patent
Shaffer et al.

(10) Patent No.: US 8,495,142 B2
(45) Date of Patent: Jul. 23, 2013

(54) SYSTEM AND METHOD FOR PROVIDING DATA CHANNEL MANAGEMENT IN A NETWORK ENVIRONMENT

(75) Inventors: Shmuel Shaffer, Palo Alto, CA (US); Amit Barave, Sunnyvale, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 12/722,389

(22) Filed: Mar. 11, 2010

(65) Prior Publication Data
US 2011/0225238 A1 Sep. 15, 2011

(51) Int. Cl.
*G06F 15/16* (2006.01)
(52) U.S. Cl.
USPC .......................................... 709/204; 709/227
(58) Field of Classification Search
USPC .................................................. 709/204, 227
See application file for complete search history.

(56) References Cited

U.S. PATENT DOCUMENTS

| | | | |
|---|---|---|---|
| 4,359,603 A | 11/1982 | Heaton | |
| 4,730,306 A | 3/1988 | Uchida | |
| 5,048,082 A | 9/1991 | Krafft et al. | |
| 5,099,510 A | 3/1992 | Blinken et al. | |
| 5,436,896 A | 7/1995 | Anderson et al. | |
| 5,539,741 A | 7/1996 | Barraclough et al. | |
| 5,539,811 A | 7/1996 | Nakamura et al. | |
| 5,625,407 A | 4/1997 | Biggs et al. | |
| 5,689,245 A | 11/1997 | Noreen et al. | |
| 5,889,769 A | 3/1999 | Mizuno | |
| 6,005,848 A | 12/1999 | Grube et al. | |
| 6,011,841 A | 1/2000 | Isono | |
| 6,011,851 A | 1/2000 | O'Connor et al. | |
| 6,094,578 A | 7/2000 | Purcell et al. | |
| 6,094,579 A | 7/2000 | Olvera-Hernandez et al. | |
| 6,151,309 A | 11/2000 | Busuioc et al. | |

(Continued)

FOREIGN PATENT DOCUMENTS

| | | |
|---|---|---|
| CN | 101461152 | 6/2009 |
| EP | 0849964 | 6/1998 |

(Continued)

OTHER PUBLICATIONS

USPTO May 24, 2012 RCE Response to Mar. 9, 2012 Final Rejection from U.S. Appl. No. 12/340,468.

(Continued)

*Primary Examiner* — Wing F Chan
*Assistant Examiner* — Andrew Woo
(74) *Attorney, Agent, or Firm* — Patent Capital Group

(57) ABSTRACT

An example method can include establishing a session involving a first end user, the first end user is included in a virtual talk group, which includes at least one other end user. A media source is provided for the session. The method also includes initiating a request for a second end user to join the session, the second end user is added to the virtual talk group. A mobile device being used by the first end user controls which data from the media source is to be sent to the second user during the session. An internet protocol (IP) address associated with the media source is withheld from communications sent to the second user. In more detailed embodiments, a control channel can be established between the mobile device and a server, the control channel managing data being sent to end users in the virtual talk group.

17 Claims, 4 Drawing Sheets

U.S. PATENT DOCUMENTS

| | | |
|---|---|---|
| 6,178,237 B1 | 1/2001 | Horn |
| 6,185,205 B1 | 2/2001 | Sharrit et al. |
| 6,233,315 B1 | 5/2001 | Reformato et al. |
| 6,327,567 B1 | 12/2001 | Willehadson et al. |
| 6,374,100 B1 | 4/2002 | Smith et al. |
| 6,385,461 B1 | 5/2002 | Raith |
| 6,400,816 B1 | 6/2002 | Hjalmtysson et al. |
| 6,404,873 B1 | 6/2002 | Beyda et al. |
| 6,408,327 B1 | 6/2002 | McClennon et al. |
| 6,418,214 B1 | 7/2002 | Smythe et al. |
| 6,421,002 B2 | 7/2002 | Krasner |
| 6,453,022 B1 | 9/2002 | Weinman, Jr. |
| 6,501,739 B1 * | 12/2002 | Cohen .......................... 370/260 |
| 6,501,740 B1 | 12/2002 | Sun et al. |
| 6,608,820 B1 | 8/2003 | Bradshaw, Jr. |
| 6,708,030 B1 | 3/2004 | Horikawa |
| 6,721,284 B1 | 4/2004 | Mottishaw et al. |
| 6,792,092 B1 | 9/2004 | Michalewicz |
| 6,813,250 B1 | 11/2004 | Fine et al. |
| 6,850,496 B1 | 2/2005 | Knappe et al. |
| 6,873,854 B2 | 3/2005 | Crockett et al. |
| 6,882,856 B1 | 4/2005 | Alterman et al. |
| 6,885,874 B2 | 4/2005 | Grube et al. |
| 6,912,389 B2 | 6/2005 | Bright et al. |
| 6,944,137 B1 | 9/2005 | Pan et al. |
| 6,965,767 B2 | 11/2005 | Maggenti et al. |
| 6,982,961 B2 | 1/2006 | Refai et al. |
| 6,987,480 B1 | 1/2006 | Kotick et al. |
| 6,987,841 B1 | 1/2006 | Byers et al. |
| 6,993,120 B2 | 1/2006 | Brown et al. |
| 6,996,088 B1 | 2/2006 | Kroon et al. |
| 6,996,406 B2 | 2/2006 | Lection et al. |
| 6,999,782 B2 | 2/2006 | Shaughnessy et al. |
| 6,999,783 B2 | 2/2006 | Toyryla et al. |
| 7,003,286 B2 | 2/2006 | Brown et al. |
| 7,006,607 B2 | 2/2006 | Garcia |
| 7,010,106 B2 | 3/2006 | Gritzer et al. |
| 7,010,109 B2 | 3/2006 | Gritzer et al. |
| 7,010,275 B2 | 3/2006 | Davies |
| 7,013,279 B1 | 3/2006 | Nelson |
| 7,031,700 B1 | 4/2006 | Weaver et al. |
| 7,034,678 B2 | 4/2006 | Burkley et al. |
| 7,035,385 B2 | 4/2006 | Levine et al. |
| 7,058,168 B1 | 6/2006 | Knappe et al. |
| 7,062,286 B2 | 6/2006 | Grivas et al. |
| 7,072,952 B2 | 7/2006 | Takehiro et al. |
| 7,079,857 B2 | 7/2006 | Maggenti et al. |
| 7,091,851 B2 | 8/2006 | Mason et al. |
| 7,149,477 B2 | 12/2006 | Ogami |
| 7,237,117 B2 | 6/2007 | Weiss |
| 7,271,742 B2 | 9/2007 | Sheha et al. |
| 7,292,544 B2 | 11/2007 | Roher et al. |
| 7,328,036 B2 | 2/2008 | Hart et al. |
| 7,339,900 B2 | 3/2008 | Perlman |
| 7,352,707 B2 | 4/2008 | Ho et al. |
| 7,369,513 B1 | 5/2008 | Sankaran |
| 7,369,530 B2 | 5/2008 | Keagy |
| 7,379,961 B2 | 5/2008 | Matsuoka |
| 7,418,090 B2 | 8/2008 | Reding et al. |
| 7,426,192 B2 | 9/2008 | Amano et al. |
| 7,460,492 B2 | 12/2008 | Portolani et al. |
| 7,463,597 B1 | 12/2008 | Kompella |
| 7,466,812 B1 | 12/2008 | Mahy et al. |
| 7,508,840 B2 | 3/2009 | Delaney |
| 7,526,306 B2 | 4/2009 | Brems et al. |
| 7,558,221 B2 | 7/2009 | Nelson et al. |
| 7,606,256 B2 | 10/2009 | Vitebsky et al. |
| 7,633,914 B2 | 12/2009 | Shaffer et al. |
| 7,636,339 B2 | 12/2009 | Shaffer et al. |
| 7,639,634 B2 | 12/2009 | Shaffer et al. |
| 7,706,339 B2 | 4/2010 | Shaffer et al. |
| 7,710,983 B2 | 5/2010 | Zheng et al. |
| 7,821,978 B2 | 10/2010 | Staack |
| 7,831,270 B2 | 11/2010 | Kalley et al. |
| 7,860,070 B2 | 12/2010 | Shaffer et al. |
| 7,860,958 B2 | 12/2010 | Yoon et al. |
| 7,869,386 B2 | 1/2011 | Shaffer et al. |
| 7,933,286 B2 | 4/2011 | Vitebsky et al. |
| 7,953,859 B1 | 5/2011 | Kiefhaber et al. |
| 2002/0152305 A1 | 10/2002 | Jackson et al. |
| 2003/0055711 A1 | 3/2003 | Doherty |
| 2004/0139320 A1 | 7/2004 | Shinohara |
| 2004/0249949 A1 | 12/2004 | Gourraud et al. |
| 2005/0015444 A1 | 1/2005 | Rambo |
| 2005/0171954 A1 | 8/2005 | Hull et al. |
| 2005/0232207 A1 | 10/2005 | Antoniadis et al. |
| 2006/0114847 A1 | 6/2006 | Dssouli et al. |
| 2006/0118636 A1 | 6/2006 | Miles et al. |
| 2006/0165060 A1 | 7/2006 | Dua |
| 2006/0281471 A1 * | 12/2006 | Shaffer et al. .............. 455/456.2 |
| 2007/0030144 A1 | 2/2007 | Titus et al. |
| 2007/0060144 A1 | 3/2007 | Mills et al. |
| 2007/0104121 A1 * | 5/2007 | Shaffer et al. ................. 370/276 |
| 2007/0115848 A1 | 5/2007 | Chean et al. |
| 2007/0202907 A1 | 8/2007 | Shaffer et al. |
| 2007/0202908 A1 | 8/2007 | Shaffer et al. |
| 2007/0203996 A1 | 8/2007 | Davitz et al. |
| 2007/0239824 A1 | 10/2007 | Shaffer et al. |
| 2007/0266097 A1 | 11/2007 | Harik et al. |
| 2007/0271336 A1 | 11/2007 | Ramaswamy |
| 2007/0280203 A1 | 12/2007 | Shaffer et al. |
| 2007/0282621 A1 | 12/2007 | Altman et al. |
| 2007/0293240 A1 | 12/2007 | Drennan |
| 2008/0005249 A1 | 1/2008 | Hart |
| 2008/0037461 A1 | 2/2008 | Biltz et al. |
| 2008/0045236 A1 | 2/2008 | Nahon et al. |
| 2008/0159128 A1 | 7/2008 | Shaffer et al. |
| 2008/0167049 A1 | 7/2008 | Karr et al. |
| 2008/0280637 A1 | 11/2008 | Shaffer et al. |
| 2009/0144377 A1 | 6/2009 | Kim et al. |
| 2010/0159975 A1 | 6/2010 | Shaffer et al. |
| 2010/0159977 A1 | 6/2010 | Shaffer et al. |
| 2010/0161727 A1 | 6/2010 | Shaffer et al. |
| 2011/0239252 A1 | 9/2011 | Kazama et al. |

FOREIGN PATENT DOCUMENTS

| | | |
|---|---|---|
| EP | 1622044 | 2/2006 |
| EP | 1920568 | 8/2006 |
| EP | 1889495 | 12/2006 |
| EP | 1920615 | 2/2007 |
| EP | 2030338 | 12/2007 |
| FR | 2674355 A | 9/1992 |
| WO | WO01/91485 | 11/2001 |
| WO | WO02/074051 | 9/2002 |
| WO | WO2006/135533 | 12/2006 |
| WO | WO2007/021586 | 2/2007 |
| WO | WO2007/027356 | 3/2007 |
| WO | WO2007/142961 | 12/2007 |

OTHER PUBLICATIONS

"5 for '05 Technologies," *Urgent Communications: Service, Safety, Security*, Dec. 1, 2004; 6 pages; http://urgentcomm.com/mag/publicsafety/radio_technologies/.

Bender, Ron, et al., "Multiple Choices for Critical Communications," *Urgent Communications, The Official Publication of IWCE*, Oct. 2001, 4 pages; http://urgentcomm.com/mag/radio_multiple_choices_critical_2/.

C3 MaestroIP Dispatch Console, OpenSKY, NetworkFirst, P25IP, Data Sheet, Harris Public Safety and Professional Communications, [Printed on Jun. 28, 2011] 2 pages http://www.pspc.harris.com/media/ECR-7160E_tcm27-10458.pdf.

"Collaborative Incident Response," Cisco IPICS, Solution Overview, © Cisco Systems, Inc. 2010, 2 pages, www.cisco.com/go/ipics.

Herther, Jay, et al., "Voice-Over-interintranet Protocol for Critical Communications," *Urgent Communications, The Official Publication of IWCE*, Aug. 2001, 3 pages http://urgentcomm.com/mag/radio_voiceoverintranet_protocol_critical/.

Interoperability Gateway, OpenSky, NetworkFirst, P2SIP, Data Sheet, Harris RF Communications, ECR-7054, 2 pages [Printed on Jun. 28, 2011] http://www.pspc.harris.com/media/ECR-7054E_tcm27-10470.pdf.

"M/A-Com Emphasizes Power of IP in Seven Announcements at APCO," *Urgent Communications: Service, Safety, Security* Aug. 18, 2002, 5 pages http://urgentcomm.com/products/new/radio_macom_emphasizes_power/index.html.

McKay, Jim, "Intact Amid Chaos," *Government Technology*, Mar. 2005, 2 pages http://www.bultronic.net/documents/articles/intact%20amid%20chaos.pdf.

NetworkFirst Interoperability Solved, Data Sheet, M/A-COM, Inc., ECR-7018A, [Printed on Jun. 28, 2011] 6 pages; http://www.ka-omminc.com/PDF/NetworkFirstRevised5_03.pdf.

Polk, J., et al., "Dynamic Host Configuration Protocol Option for Coordinate-based Location Configuration Information," Network Working Group, Internet RFC 3825, Jul. 2004, 15 pages.

Rivero-Angeles, Mario et al., "Random-Access Control Mechanism Using Adaptive Traffic Load in ALOHA and CSMA Strategies for EDGE," *IEE Transactions on Vehicular Technology*, vol. 54, No. 3, May 2005; Abstract Only http://ieeexplore.ieee.org/xpl/freeabs_all.jsp?arnumber=1433259.

VIP Dispatch Console, OpenSky, NetworkFirst, P25IP, Data Sheet, M/A-COM, Inc. ECR-721C, © 2006 M/A-COM, Inc., 2 pages http://www.bultronic.net/documents/NetworkFirst/VIP%20Dispatch%20Console.pdf.

USPTO Jun. 27, 2011 Notice of Allowance from U.S. Appl. No. 12/340,417.

USPTO Jul. 11, 2011 Nonfinal Office Action from U.S. Appl. No. 12/340,451.

USPTO Jan. 17, 2012 Response to Oct. 14, 2011 Nonfinal Office Action from U.S. Appl. No. 12/340,468.

USPTO Mar. 9, 2012 Final Rejection from U.S. Appl. No. 12/340,468.

Wikipedia, "Plectron," http://en.wikipedia.org/wiki/Plectron, Dec. 18, 2008, 2 pages.

Thunder Eagle, Inc.—Radio Wireless Alerting Systems, "MRI-100™: Multi Radio Interface," http://www.thuneagle.com/mri100.htm, Dec. 18, 2008, 2 pages.

Positron Public Safety Systems, "Product Specifications: Power RADIO," http://www.positron911.com/products/powerRADIO/powerRADIO_specs.asp, Dec. 18, 2008, 2 pages.

Wikipedia, "Minimum spanning tree," http://en.wikipedia.org/wiki/Minimum_spanning_tree, Dec. 18, 2008, 5 pages.

Wikipedia, "Distributed minimum spanning tree," http://en.wikipedia.org/wiki/Distributed_minimum_spanning_tree, Dec. 18, 2008, 2 pages.

Trimeche, M., et al., "Digital Rights Management for Visual Content in Mobile Applications," published Sep. 27, 2004; ISBN 0-7803-8379-6; © 2004 IEEE; http://ieeexplore.ieee.org; pp. 95-98.

USPTO Oct. 11, 2011 Response to Nonfinal Office Action mailed Jul. 11, 2011 from U.S. Appl. No. 12/340,451.

USPTO Oct. 14, 2011 Nonfinal Office Action from U.S. Appl. No. 12/340,468.

U.S. Appl. No. 13/210,967 entitled "System and Method for Providing Channel Configurations in a Communications Environment," filed Aug. 16, 2011; Inventors: Shmuel Shaffer, et al.

USPTO Nov. 9, 2011 Notice of Allowance from U.S. Appl. No. 12/340,451.

PCT International Search Report mailed Feb. 10, 2001 for PCT/EP01/04570; 1 page.

PCT International Search Report mailed Feb. 13, 2003 for PCT/US02/08419; 2 pages.

PCT International Search Report and Written Opinion mailed Sep. 4, 2007 for PCT/US06/19227; 7 pages.

PCT International Preliminary Report on Patentability (1 page) and the Written Opinion of the International Searching Authority (3 pages), mailed Dec. 11, 2007 for PCT/US06/19227.

PCT Notification of Transmittal of the International Search Report mailed Feb. 27, 2007, for PCT/US06/30447; 2 pages.

PCT International Preliminary Report on Patentability (1 page) and the Written Opinion of the International Searching Authority (14 pages), mailed Feb. 12, 2008 for PCT/US06/30447.

PCT Notification of Transmittal of the International Search Report mailed Apr. 9, 2007, for PCT/US06/30294; 1 page.

PCT International Preliminary Report on Patentability (1 page) and the Written Opinion of the International Searching Authority, or the Declaration (4 pages) mailed Mar. 14, 2008, for PCT/US06/30294.

PCT Notification of Transmittal of the International Search Report and the Written Opinion of the International Searching Authority mailed Sep. 17, 2008 for PCT/US07/12728; 6 pages.

PCT International Preliminary Report on Patentability (1 page) and the Written Opinion of the International Searching Authority (5 pages) mailed Dec. 3, 2008 for PCT/US07/12728.

* cited by examiner

SYSTEM AND METHOD FOR PROVIDING DATA CHANNEL MANAGEMENT IN A NETWORK ENVIRONMENT

TECHNICAL FIELD

This disclosure relates in general to the field of communications and, more particularly, to providing data channel management in a network environment.

BACKGROUND

Networking architectures have grown increasingly complex in communication environments. This complexity has resulted in numerous protocols being implemented to intelligently respond to challenging situations. Push-to-talk (PTT) devices are commonly used in safety and security environments. PTT devices carried by emergency response personnel (ERT) can support a single channel or a plurality of channels for a group of individuals. Typically, a management center supports/coordinates a plurality of channels. The ability to provide a system or a protocol that offers an effective coordination for data streams in a communications environment provides a significant challenge to network designers, component manufacturers, service providers, and system administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes establishing a session involving a first end user, the first end user is included in a virtual talk group, which includes at least one other end user. A media source is provided for the session. The method also includes initiating a request for a second end user to join the session, the second end user is added to the virtual talk group. A mobile device being used by the first end user controls which data from the media source is to be sent to the second user during the session. An internet protocol (IP) address associated with the media source is withheld from communications sent to the second user.

In more detailed embodiments, a secure data channel is established between the mobile device and a server, where a Hypertext Transfer Protocol Secure (HTTPS) protocol is used to establish the secure data channel. A control channel can be established between the mobile device and a server, the control channel managing data being sent to end users in the virtual talk group. Media being delivered to the first end user can be passed to a mobile device being used by the second end user. In other examples, the method can include proxying the data to be sent to the second end user such that the mobile device operates as a passthrough data gateway for the second end user during the session. In yet other examples, the method can include filtering the data to be sent to the second end user such that specific types of data are sent to the second end user, the session including text data, graphical data, audio data, video data, and/or multimedia data. A period of time can be configured for the second end user's access to the session.

Example Embodiments

Figure 1:
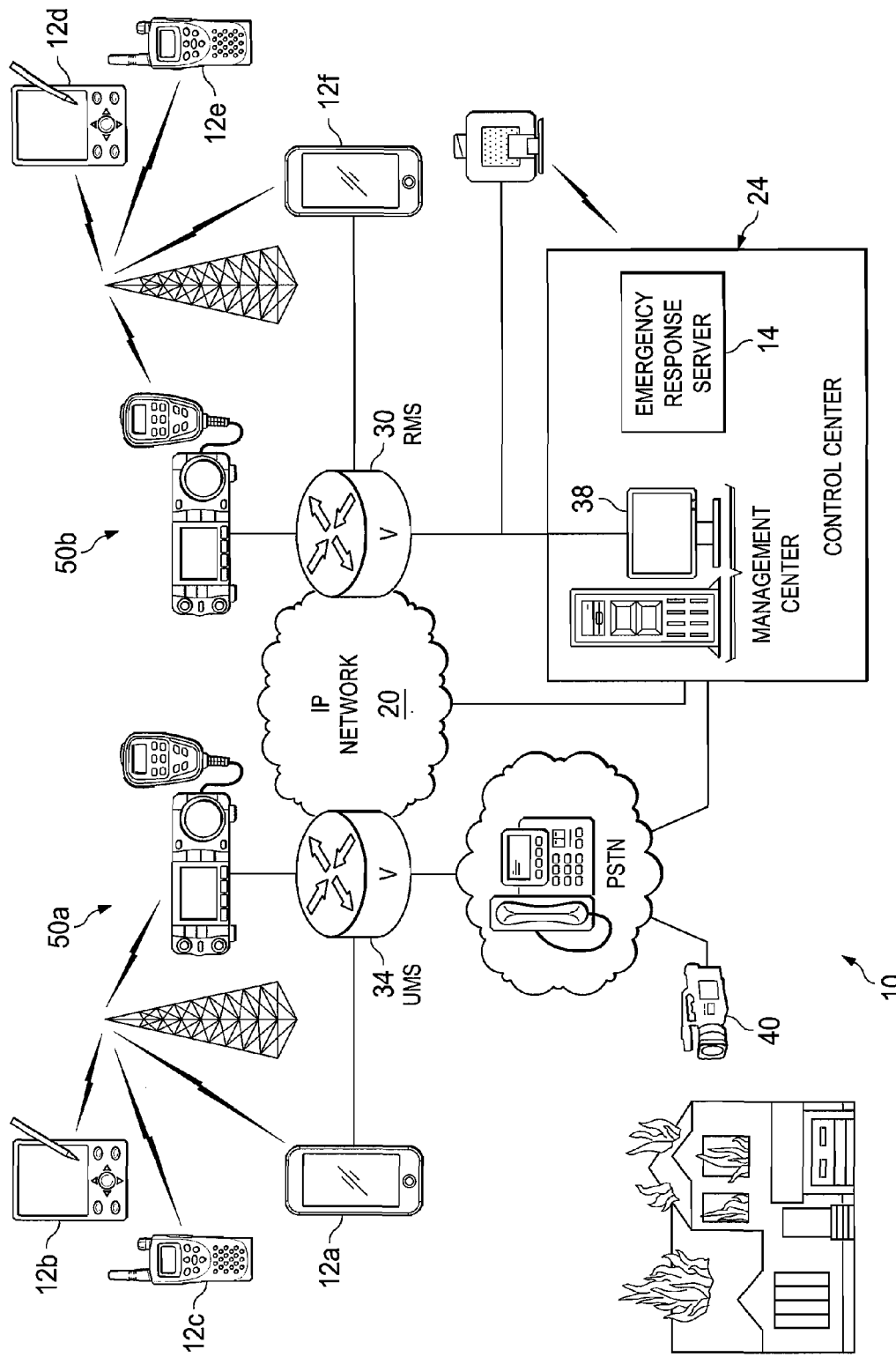
FIG. 1 is a simplified block diagram of a communication system for providing data management in a network environment in accordance with one embodiment of the present disclosure.

Turning to FIG. 1, FIG. 1 is a simplified block diagram of a communication system 10 for providing data management in a network environment in accordance with one example implementation of the present disclosure. Communication system 10 may include one or more mobile devices 12*a-f*, which can interact with each other and with other components over the illustrated network infrastructure. FIG. 1 also includes an Internet protocol (IP) network 20, which is coupled to a router media service (RMS) element 30 and a universal media service (UMS) element 34. UMS 34 can be coupled to a public switched telephone network (PSTN) and, further, UMS element 34 can effectively coordinate sessions for a multitude of end users. UMS element 34 and RMS 30 have similar functionality and these elements can be viewed as interchangeable. RMS 30 is coupled to a control center 24, which includes a management center 38 and an emergency response server 14.

Also provided in FIG. 1 is a set of radio devices 50*a-b*, which may be coupled to UMS 34 or to RMS 30. Note that the end-user devices of FIG. 1 are providing just some of the many examples that could be used in conjunction with the present disclosure. In general, radio devices 50*a-b* can be linked to a router to provide radio connectivity to IP network 20. FIG. 1 also includes a video camera 40 that is monitoring a fire, where camera 40 could be attached to a PSTN, to IP network 20, etc. Video camera 40 is simply one of the many media sources that can ultimately be shared by responders, as detailed herein. The media source can be part of (or be provided in conjunction with) UMS element 34, RMS 30, video feeds, audio feeds, streaming data, cameras, web sites, databases, etc., or any other appropriate source, where appropriate. Communication system 10 may utilize a transmission control protocol (TCP)/IP, a user datagram protocol/IP (UDP/IP), or any other suitable protocol where appropriate and based on particular needs. Communication system 10 may be generally configured or arranged to represent a 2G, a 2.5G, a 3G, or a 4G communication architecture applicable to a Global System for Mobile (GSM) environment in accordance with a particular embodiment of the present disclosure. Communication system 10 may also be configured to operate with any version of any suitable wireless or cellular protocol.

For purposes of illustrating certain example techniques of communication system 10, it is important to understand the communications that may be traversing the network during emergency event scenarios. The following foundational information may be viewed as a basis from which the present disclosure may be properly explained. Mobile devices, such as those shown in FIG. 1, are commonly used in safety and security environments. PTT devices (often carried by emergency response personnel (ERT)) can support voice channel communications. IP communications systems can shift emergency communications to IP networks (e.g., using gateways). Furthermore, the typical user (e.g. an emergency responder) may carry a wireless mobile device, a smart phone, etc., and network coverage for these newer devices can be better than conventional radio links, which may not provide coverage in certain areas.

Mobile devices (e.g., smart phones, handheld devices, etc.) have improved significantly in their computing power and in their ability to run various user applications. Taking advantage of the increased processing power and memory size of mobile devices, customers can use these devices to view multimedia-based applications such as video surveillance, watching a live WebEx Meeting, unified communication interactions, contact center supervisor applications, etc. Similarly, emergency response and management systems can utilize mobile devices to render live video feeds from an ongoing event, or from an area under surveillance. This functionality enables a mobile emergency responder to view live video feeds for an emergency incident in which they may be involved.

In an emergency situation where an incident has occurred, a call would typically be routed to a given administrative individual, network node, control center, etc. An administrative person (e.g., a dispatcher) could have a response mechanism in which ERT members would be immediately contacted. Those individuals (e.g., responders) could be part of specific teams that are relegated for certain emergency tasks (e.g., responding to a fire, to a bomb threat, to a shooting incident, etc.). As an event unfolds, a mobile emergency responder may need to involve other individuals/users in the incident. The emergency responder and the new users can engage in one-to-one calls, or the emergency responder may bring new users into a conference bridge established to manage an ongoing event. Any assembly, designation, or grouping of individuals (e.g., an emergency response team) that can interact via a one-to-one call, a conference call, a video session, a push-to-talk session, or a hybrid communication modality of the previously identified elements may be referred to as a virtual talk group (VTG). Additionally, any communication channel (wired, wireless, proxied, etc.) between such individuals may constitute a 'session' as used herein in this Specification.

After establishing the VTG, a responder who was added to the VTG can gain access to a video feed viewed by the other members of the VTG. Commonly, systems require that the dispatcher provide a new user with the uniform resource locator (URL) of the video feed and a password to access the video feed. This manual process is error prone and time consuming: particularly for noisy and urgent situations in which emergency responders typically operate.

Communication system 10 offers an approach for seamlessly adding a new emergency response team member to an ongoing event. This can be done by a first user using his own mobile device (e.g., such as his iPhone) to add the new member to the VTG, and then automatically share multimedia resources with that new member. The system also facilitates the automated transfer of control of an incident to another user. Such an approach offers an automated and secure method to directly provide video feeds to a called party via a mobile device. Thus, communication system 10 can facilitate an emergency response interoperability solution amongst emergency response team members, in contrast to solutions based on rudimentary coordination activities between radios. Additionally, the dispatcher or responder who adds the new user can terminate media streaming to the user at any appropriate time. This would afford the ability to not only provide access rights, but also to withdraw these access rights at any time.

It should be understood that there are two classes of users: 1) users who are part of an ERT team and, hence, have credentials and/or privileges and the necessary equipment to participate in an emergency event; and 2) new/invited users (who may, for example, be invited for their language skills in order to translate specific signs, explain how to handle high-voltage equipment, etc.), where these users may not have all the credentials, privileges, equipment, clearance, etc. required to give them access to the context information related to a specific event. As the ERT members are alerted and join an event, they can immediately gain access to all resources and data. The members of the ERT team can invite a new participant from this second class of users (e.g., who does not have the security clearance) and provide him with a controlled access to the contextual event information.

In example embodiments, communication system 10 is configured to enhance the outreach capabilities of emergency responders by offering an ability to place an ad hoc call to a new responder and, further, to provide the new responder with access to multimedia resources (e.g., voice, data, and video) relevant to an incident. In addition, and as part of a security mechanism, a new emergency response team member can be required to authenticate himself before he gains access to the media stream. In addition, the video stream can be extended to the new emergency response team member over a secure channel.

Additionally, any new participant can have access to the video surveillance media streams, as long as he remains in the established virtual group. As soon as he disconnects, or he is disconnected from the group (e.g., by a control party), he can no longer view video streams related to the event/incident. Note that the dispatcher does not need to convey the URL of the surveillance cameras and/or any associated password. The emergency application can automatically address this information exchange as part of the enhanced call setup functionality, as discussed below. The dispatcher has the option to remove the responder, who added the new user to the VTG, or the dispatcher can decide to keep the responder in the VTG, but modify the access rights of the responder and/or the new user. Additionally, in certain example implementations, the new user does not have the URL of the video source, or the address of the management server and this could prevent the new user from launching a cyber attack (such as denial of service (DOS)) against the video source.

Also, communication system 10 provides a mechanism for seamlessly transferring an incident response session from one responder to another, while preserving the entire context of the session. This capability can be particularly valuable in circumstances such as: 1) incidents occurring during an employee shift change; or 2) a responder leaving the geographic area relevant to the incident such that he could effectively transfer the incident control over to another responder, who may be closer to the location of the emergency. Any number of emergency response scenarios is possible and, further, some of these potential scenarios are illustrated in an example set of flow diagrams depicted in FIGS. 3-4. Before turning to some of the operations of these arrangements, a brief discussion is provided about some of the possible infrastructure of FIG. 1.

Mobile devices 12a-f can be associated with end users wishing to initiate a communication in communication system 10 via some network. The term 'mobile device' is inclusive of devices used to initiate or receive a communication, such as a computer, a personal digital assistant (PDA), a laptop or electronic notebook, a cellular telephone, an iPhone, an IP phone, a Google Droid, a push-to-talk radio device, or any other device, component, element, or object capable of initiating or receiving voice, audio, video, media, or data exchanges within communication system 10. Mobile devices 12a-f may also be inclusive of a suitable interface to the human user, such as a microphone, a display, or a keyboard or other terminal equipment. Mobile devices 12a-f may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

IP network 20 represents a series of points or nodes of interconnected communication paths for receiving and transmitting packets of information that propagate through communication system 10. IP network 20 offers a communicative interface between mobile devices 12a-f and selected networks, and may be any local area network (LAN), wireless local area network (WLAN), metropolitan area network (MAN), Intranet, Extranet, wide area network (WAN), virtual private network (VPN), or any other appropriate architecture or system that facilitates communications in a network environment. IP network 20 may support TCP/IP communication protocols. IP network 20 may alternatively implement any other suitable communication protocol for transmitting and receiving data packets within communication system 10.

Figure 2:
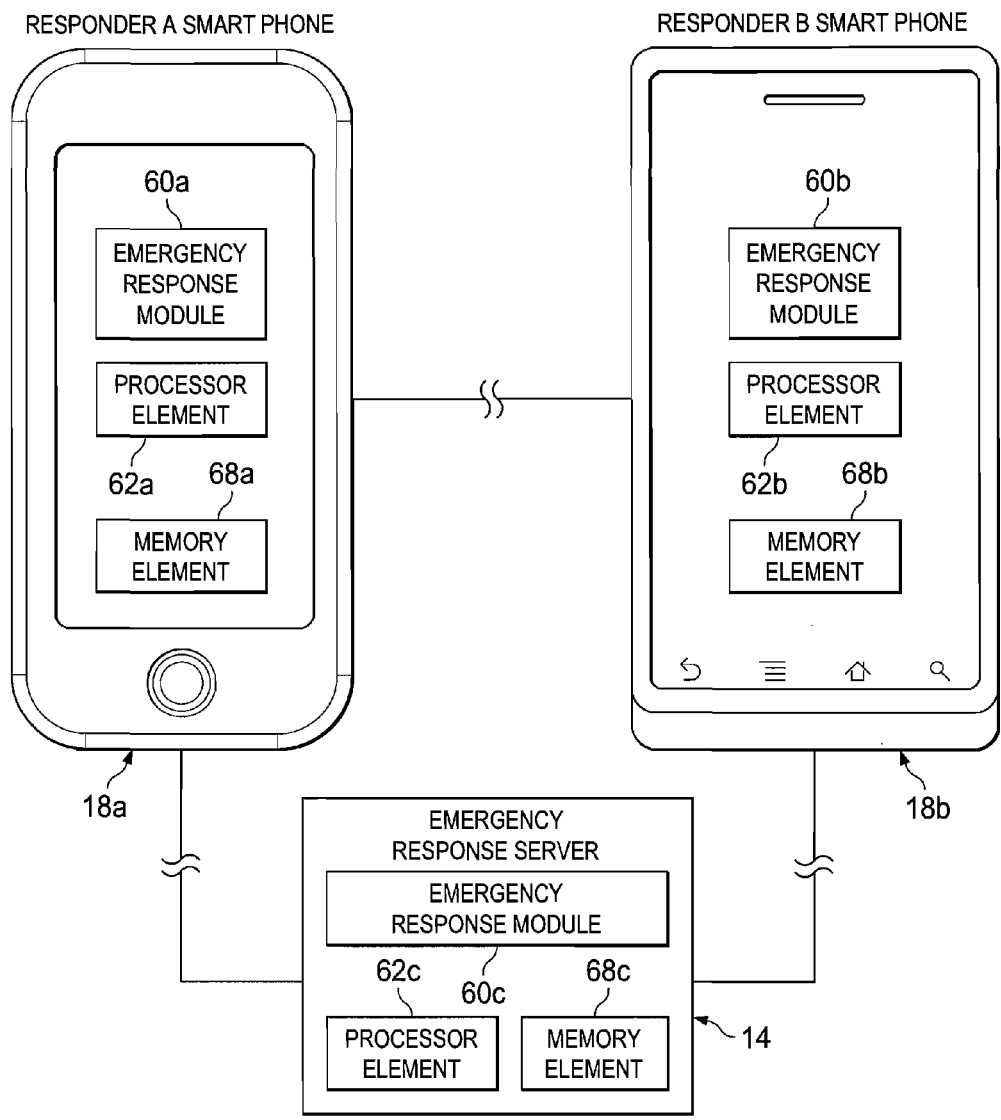
FIG. 2 is a simplified block diagram showing details associated with the communication system in accordance with one embodiment of the present disclosure.

Turning to FIG. 2, FIG. 2 is a simplified block diagram of smart phones 18a-b and emergency response server 14. In one example implementation, each of these elements may include a respective processor element 62a-c, a respective memory element 68a-c, and a respective emergency response module 60a-c. In this particular example, responder A is operating smart phone 18a, which is an iPhone. Responder B is operating smart phone 18b, which is a Google Droid. In one example, emergency response modules 60a-c are simply applications resident in the smart phones and the server. These applications have the intelligence to contact (and to interact with) each other in a network environment, as detailed below.

In operation, both the responders can use their smart phones 18a-b to involve additional users in an event on an ad hoc basis. This could be done, for example, in instances where additional users had specialized knowledge for responding to particular emergency situations. In one example, a first responder can invite or join another individual into the emergency scenario such that all the information related to the emergency event in which the first responder participates, and which is maintained at emergency response server 14, is effectively delivered to the additional individual. The additional individual could be quickly authenticated and, subsequently, given a context such that he is quickly made aware of the emergency situation. In another example, a first responder may have to depart the emergency scene such that reaching out to an additional responder (and providing that new responder with an appropriate context) would allow the additional responder to take over for the first responder in his absence.

Consider an example operation that may be illustrative of some of the features of communication system 10. An incident may be occurring, where an emergency response team (ERT) has already been established. Members of the ERT team can be given access to a video stream (such as an RSS feed) from video surveillance cameras at the location where the event is unfolding. The dispatcher handling the event/incident can decide to add another user to the ERT. For example, the new user may be more familiar with the geography where the emergency incident is occurring, or he may have specialized expertise with certain equipment/situations involved. The dispatcher can elect to make a call to a new user's mobile device (e.g., a smart phone) to invite or join him into the emergency event.

The called user can receive the call on his smart phone and, after being quickly authenticated, he can be added to the respective virtual talk group of the event. Subsequently, it can be determined whether the new user should have access to the video stream from the event. This determination can be made based on parameters such as the identification of the new user (which could be a known caller ID for the incident dispatch center), an attribute set in the call set up signaling headers, a dual-tone multi-frequency (DTMF) command signal from the event dispatcher, etc. If it is determined that the new member of the ERT needs to gain access to the video stream, the smart phone can launch an emergency response application (i.e., emergency response module 60a-b), as further detailed below.

For security purposes, the emergency application may require the called user to enter his password in order to initiate a secured data link with the emergency application server. In one implementation, the user's client (e.g., the iPhone) may have the emergency application active at all times. Alternatively, such a client mechanism may launch the emergency response application only as part of initiating the call to the new member being added to the active virtual talk group. In other embodiments, such a response protocol could be employed in an iPhone, which can leverage the iPhone's event notification framework. Once a call is established, both endpoints can be configured to run an instantiation of the emergency response application. In one embodiment, the emergency response application of the new user can establish a secured session with the emergency response application of the responder who adds the new user to the event. In other embodiments, the new user can receive the IP address of emergency response server 14, or the IP address of the media (e.g., video) source.

An architecture that operates in this manner has the advantage of being able to stop any streaming of the video to the new participant once the responder, who invited the new participant to join the VTG, stops the call with the new participant. In another example implementation, the emergency application of the responder's client establishes a peer-to-peer exchange with the emergency application on the new participant's mobile phone. In different embodiments, the architecture can use this connection to automatically convey the URL and a secured key/password to the smart phone of the newly added member. The emergency application can then use this information to automatically access the video stream related to the ongoing event. When the call (e.g., a voice stream) is stopped, the architecture can block the new member's access to the video stream. In order to achieve this, a communication can be sent to the video feed server and to the other group members to negotiate a new video feed encryption key. The new key can be conveyed to all group members, but this would not necessarily be sent to the new participant, who is being dropped from the ongoing event.

In one implementation, mobile devices 12a-f (inclusive of smart phones 18a-b) and emergency response server 14 include software to achieve (or to foster) the data management operations, as outlined herein in this Specification. Note that in one example, each of these elements can have an internal structure (e.g., a processor, a memory element, etc.) to facilitate some of the operations described herein. In other embodiments, these data channel management features may be provided externally to these elements or included in some other element to achieve this intended functionality. Alternatively, mobile devices 12a-f (inclusive of smart phones 18a-b) and emergency response server 14 may include this software (or reciprocating software) that can coordinate with other network elements in order to achieve the operations, as outlined herein. In still other embodiments, one or several devices may include any suitable algorithms, applications, applets, hardware, software, components, modules, interfaces, or objects that facilitate the operations thereof.

Figure 3:
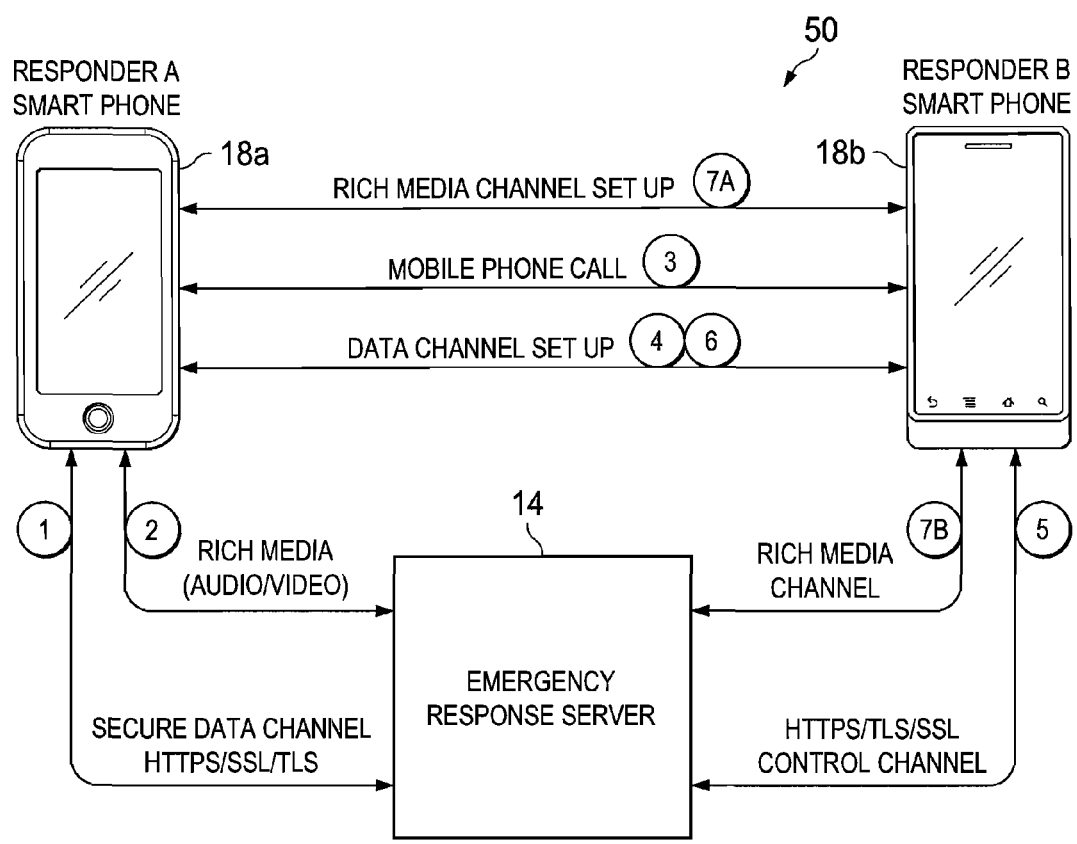
FIGS. 3-4 are simplified flow diagrams illustrating potential operations associated with the communication system.

FIG. 3 is a simplified flow diagram 50 illustrating some example activities associated with a channel set up. This particular flow implicates smart phones 18a-b and emergency response server 14. At step one, there is a secure data channel established between responder A's smart phone 18a and emergency response server 14. This could involve a Hypertext Transfer Protocol Secure (HTTPS) protocol, which is a combination of the Hypertext Transfer Protocol (HTTP) with the secure sockets layer (SSL)/transport layer security (TLS) protocol for providing encryption and a secure identification of network devices. It should also be noted that responder A and responder (participant) B may be connected over any IP or non-IP network. For example, this could involve cellular networks, radio, Bluetooth communications, WiFi, WiMAX, etc. Step two illustrates an example in which rich media propagates between smart phone 18a and emergency response server 14. Note that emergency response server 14 is used for control and for managing channels and VTGs. Media does not need to (and usually does not) flow through emergency response server 14. Control channels can be responsible for session setup, and this can be done by emergency response server 14. Media can flow between endpoints, where the video can originate from a video feed/camera. A mobile phone call is initiated by responder A at step three, where a data channel set up operation is conducted at step four. At step five, a control channel can be established between smart phone 18b and emergency response server 14. Again, this can involve HTTPS/SSL/TLS connections in this particular example.

Note that a new participant (responder B) does not receive the URL of emergency response server 14. Rather, smart phone 18a can act as a gateway through which smart phone 18b receives its data. This prevents new participants, who may not have the security clearance, from ever obtaining the address of emergency response server 14. This lack of a URL prohibits an external user from launching a cyber attack against emergency response server 14.

Note that in certain examples, responder A can fill various roles in these situations. For example, responder A may operate as an authentication proxy for responder (participant) B. In addition, responder A may operate to proxy particular flows for responder B. For example, once authentication occurs, responder A may operate as a passthrough data gateway for communications involving responder B. Smart phone 18a can reformat or transcode the data arriving from the video feed and serve it to smart phone 18b in any appropriate format, or smart phone 18a can use a suitable codec supported by smart phone 18b. In still other scenarios, responder A can be discerning about which data should flow to responder B. For example, responder A can control which types of information are sent to the newly added party, the length of time for which this party is granted access, the particular types of content to be sent (or not sent) to the newly added party (e.g., confidential documents, images, objects, etc. being restricted from view, certain conversations between selected individuals of the group not being heard by the newly added party, sounds being muted for various participants of the group, or for a certain time interval, etc.) In a general sense, responder A can receive data from video camera 40, where emergency response server 14 handles session set-up. The media can originate from any appropriate source (e.g., UMS, RMS, video feeds, cameras, etc.). Thus, responder A can employ intelligence in order to route particular packets to responder B. Other scenarios could involve an unrestricted access for responder B.

In this particular example of FIG. 3, and as illustrated at step six, there is a data channel set up between the responder A and the new participant (responder B), who has been invited to join the VTG by responder A. Step 7A illustrates a rich media channel set up between smart phones 18a-b. Alternatively, a rich media channel may be established between emergency response server 14 and smart phone 18b, as is illustrated in step 7B. In such an arrangement, responder A can extricate itself from the flow such that responder B is only involved in communications with emergency response server 14.

Figure 4:
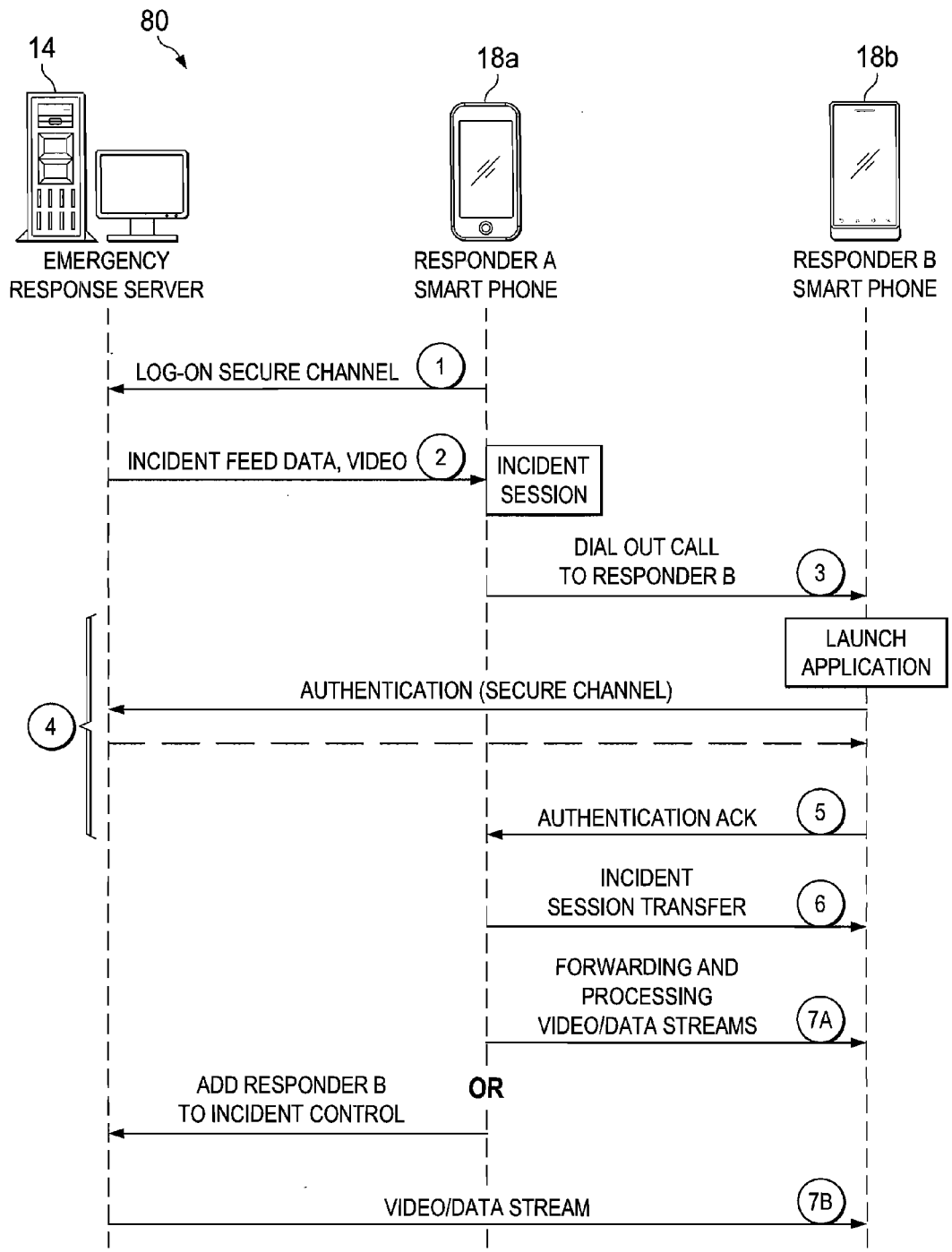

FIG. 4 is a simplified flow diagram 80 that includes interactions between emergency response server 14 and smart phones 18a-b. This particular flow begins at step one, where there is an effective login by smart phone 18a. At step two, there is an incident occurring such that data and video can be sent to responder A. At step three, responder A decides to add a new participant (responder B) into this particular emergency situation. There is a dial out call function that occurs to responder B. When this call is received, an application resident on smart phone 18b is launched. In other examples, there is no need to launch a new application; rather smart phone 18a sends a video feed to smart phone 18b, which can be handled by normal video processing applications resident in smart phone 18b.

At step four, a secure channel is established after authentication is completed for responder B. Thus, step four is representing a two-step process in which an authentication occurs (e.g., including authentication credentials) that involve emergency response server 14, where a pathway can later be established between the endpoints of responders A-B. At step five, a simple acknowledgment (e.g., an ACK message) can be sent from smart phone 18b to smart phone 18a. At this juncture, responder A and responder B are in a session together. At step six, responder A elects to transfer the incident session to responder B. As data is being transferred from smart phone 18a to smart phone 18b, responder A can offer more than simple forwarding for this particular flow. For example, responder A can process the incoming data, or offer a filtering function in which only certain information is sent along to responder B. In other scenarios, there is a straight passthrough mechanism provided by the application on smart phone 18a. Thus, there can be certain privileges granted between individuals, or access privileges established such that data communications are affected in the context of an emergency response. In a specific example embodiment, a smart phone of responder A may provide a protocol translation between the connection setup used between smart phone 18a and the media (video) source and also between the media streaming setup involving smart phones 18a and 18b. Step 7A illustrates these forwarding and processing activities of video/data streams.

Note that in alternative embodiments, responder A can add responder B to the incident control, as depicted in FIG. 4. This would allow the video/data stream to propagate directly to responder B and, further, would allow responder A to be removed from this particular session. This could be in the context of responder B having certain expertise in a particular area such that his control should take precedence over responder A. In other scenarios, responder A may simply have to leave this emergency response scenario. This direct linking between emergency response server 14 and responder B allows responder A to extricate himself from this particular session. Step 7B illustrates a video/data stream being conducted between the three entities: emergency response server 14, smart phone 18a, and smart phone 18b.

Consider yet another example flow that is illustrative of certain aspects of communication system 10. In this particular example, a group of responders from a specific group (e.g., a SWAT unit) has been granted access to all relevant information regarding a situation they are tasked with handling. This access may include voice, video, and data streams. As an event develops, the team elects to bring in an expert, who is not a member of the SWAT unit. In this particular example, the event requires that a facility manager be involved in order to ask him about the contents of a specific room, which is about to be entered by the SWAT unit. Specifically, the unit commander in this example seeks to know more information about the content within the containers in a given room.

The facilities manager is quickly contacted via his mobile device; however, the manager needs to see the specific container before he can discuss its contents. To accommodate this, the commander grants access to the media stream to the facilities manager, but for only a limited time. In this instance, the commander does not desire to allow the facilities manager permanent access throughout the duration of the operation. Providing the facilities manager with access to the secure website may allow him access to the video for a somewhat arbitrary duration, which is not acceptable in this scenario. In addition, the facilities manager's mobile device may support video, but it may not have a web browser that could allow for access to the video stream, or his device may not support the proprietary signaling or format of the secured data/video feed.

Communication system 10 offers an application running on the SWAT team member's mobile device. This application (i.e., which can be provided by emergency response modules 60a-b) can capture the media stream that is rendered to a push-to-talk device of the SWAT team member's hand-held device and, further, translate it into media streaming protocols supported by mobile devices (e.g., an iPhone, a Google Droid, etc.). The application can then (upon command from the responder A") forward (or process and forward) the media stream to another hand-held device.

In using the application, the SWAT team member can stop streaming the video portion to the facilities manager at any desired time, while continuing to talk with him over the voice channel. This feature enables the SWAT team to expose specific operation-related data/media streams for only a required duration. Far more than simply establishing a secure connection, communication system 10 facilitates and controls access to data for a limited period of time, which can be determined by responder A. For example, communication system 10 can be configured to enable a SWAT team member to grant access to the video feed to the facilities manager and then retract access permission using a mobile device.

Thus, communication system 10 is configured to facilitate temporary access with the ability to disconnect video access to an external consultant at any given moment. Additionally, communication system 10 may support specific and configurable data filtering: enabling responder A to limit streaming of specific content to participant B based on, for example, metadata associated with the media stream. In another example, when explicit or confidential pictures appear on a screen (where such images should not be seen by the facilities manager) a SWAT team member may quickly stop the video stream from being sent to the facilities manager. This can be done by a single button push, without affecting the video streaming to or from the other SWAT team members and, further, while maintaining voice connectivity with the facilities manager. Similarly, communication system 10 may be configured to automatically block any streaming of specific media based on the associated metadata. Communication system 10 provides a mechanism for any responder to stream/share video with a single button push to a new temporary member, who is joined into a session. It should be noted that the video, which the first viewer is watching, could be rendered using a session initiation protocol (SIP) call, an RSS feed, or via any other type of media stream (e.g., a proprietary format that may be used by a special group of responders). It should be noted that the media format and session establishment used to render the media stream to the temporary new member may be different from the media format and session establishment used for establishing the session and media exchange amongst the other SWAT team members.

All of these session initiation and termination activities can be done without altering passwords, as it may be critical to not adversely affect other SWAT team member's activities. If an individual were to change the password, or somehow reserve the media stream, critical information could be lost during the transition. Using the tendered architecture, the other SWAT team members in this scenario would continue to receive the media stream unaffected. Such activities may be performed (in one example implementation) in the application layer and, as such, it could traverse various types of networks (e.g., a mobile ad hoc network (MANET), a cellular network, a 3G network, a PTT network, etc.). Additionally, as the video streams are shared, complicated URLs and passwords are not necessary because a trusted relationship (e.g., some form of authentication such as recognizing the voice of the new temporary member) could exist between the two users attempting to share video data. The first user's device can transcode data and selectively disconnect the video stream at any appropriate time. Note that the elimination of any requirement to input cumbersome URLs and passwords may be important in emergency response scenarios. It should be noted that the fact that the IP address of the video source is not exposed to the new temporary member, or to any other external entity, provides an additional security level to the operation and, thereby, makes it more difficult to launch a cyber attack against emergency response server 14 and/or the media source.

In regards to specific types of formatting, assume that person A is a member of a specific team and this member of the team has an endpoint device that can receive the specific video format used by the team. In this particular example, a proprietary formatting is used for video streams such that outside personnel cannot view information within the streams without performing some type of encoding, decryption, processing, or conversion operation. Person B in this example is not a member of the team and, therefore, does not necessarily have an endpoint device that can process (decode and display) the specific media stream used by the team. Person B also does not have access to the media stream, as he does not have the IP address of the media source, and the media is encrypted, encoded, or otherwise not accessible by people who are not members of the specific team.

The challenge lies in providing access to any video stream format (including proprietary formats) to any person who does not necessarily have an endpoint device that can decrypt, decode, and display the specific video data. In this particular example, not only does person A wish to selectively stream data to person B, but person A may like to allow a continual voice stream to person B, regardless of whether video is being streamed. Communication system 10 can readily accommodate this scenario. In alternative embodiments, person B could also be granted two-way video stream access such that person B could use their device to capture video information being sent to other members of the group. For example, person B (once deployed in the environment) can use their own device to provide an additional video vantage point for the responder, for any newly added participant, for other team members, or for any other individual granted access to the session, the media streams, etc.

Note that in certain example implementations, the data management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, memory elements 68a-b (as shown in FIG. 2) can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, processors 62a-c (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, mobile devices 12a-f (inclusive of smart phones 18a-b) and emergency response server 14 may include software in order to achieve the data management functions outlined herein. These activities can be facilitated by emergency response modules 60a-c. Mobile devices 12a-f (inclusive of smart phones 18a-b) and emergency response server 14 can include memory elements for storing information to be used in achieving the intelligent data management, as outlined herein. Additionally, mobile devices 12a-f (inclusive of smart phones 18a-b) and emergency response server 14 may include a processor that can execute software or an algorithm to perform the data management, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, lookup table, cache, etc.) should be construed as being encompassed within the broad term 'memory element.' Similarly, any of the potential processing elements, modules, and machines described in this Specification should be construed as being encompassed within the broad term 'processor.' Each of the elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, the present disclosure is equally applicable to various cellular and/or wireless technologies including CDMA, Wi-Fi, WiMax, long term evolution (LTE), radio, 3G, 4G, etc. In addition, other example environments that could use the features defined herein include Pico and femto architectures, where an appropriate data management mechanism would occur for one or more participants in the VTG. In other scenarios, control center 24 may provide instructions, guidance, authentication and authorization, or direct control of the data streams that are propagated to various mobile devices. This could occur in conjunction with some type of authentication and authorization being given to an external participant in the group scenarios described above. Thus, emergency response server 14 could be tasked with controlling access for members of the team, external participants, or any suitable combination thereof. This offloading of management could be significant in emergency scenarios, where team members are focused on the actual event circumstances. Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
   establishing a session involving a first end user, wherein the first end user is included in a virtual talk group, which includes at least one other end user, and wherein a media source is provided for the session; and
   initiating a request for a second end user to join the session, wherein the second end user is added to the virtual talk group, and wherein a mobile device being used by the first end user controls which data from the media source is to be sent to the second end user during the session, and wherein an internet protocol (IP) address associated with the media source is withheld from communications sent to the second end user;

wherein the session includes video data sent to the second end user without requiring a uniform resource locator, which identifies the media source, to be sent to the second end user, and wherein the mobile device is configured to disconnect the session for the second end user such that a new video encryption key is negotiated amongst the remaining end users of the virtual talk group.

2. The method of claim 1, wherein a secure data channel is established between the mobile device and a server, and wherein a Hypertext Transfer Protocol Secure (HTTPS) protocol is used to establish the secure data channel.

3. The method of claim 1, wherein a control channel for the session is established between the mobile device and a server, the control channel being configured to manage data being sent to end users in the virtual talk group, and wherein media being delivered to the first end user can be passed to a mobile device being used by the second end user.

4. The method of claim 1, further comprising:
proxying the data to be sent to the second end user such that the mobile device operates as a passthrough data gateway for the second end user during the session.

5. The method of claim 1, further comprising:
filtering the data to be sent to the second end user such that specific types of data are sent to the second end user, the session including text data, audio data, and video data, and wherein a length of time is configured for the second end user's access to the session.

6. The method of claim 1, wherein access to the data in the session is determined by an attribute set in a call set-up signaling header, or determined by a dual-tone multi-frequency (DTMF) command signal.

7. Logic encoded in one or more non-transitory tangible media that includes code for execution and when executed by a processor operable to perform operations comprising:
establishing a session involving a first end user, wherein the first end user is included in a virtual talk group, which includes at least one other end user, and wherein a media source is provided for the session; and
initiating a request for a second end user to join the session, wherein the second end user is added to the virtual talk group, and wherein a mobile device being used by the first end user controls which data from the media source is to be sent to the second user during the session, and wherein an internet protocol (IP) address associated with the media source is withheld from communications sent to the second end user;
wherein the session includes video data sent to the second end user without requiring a uniform resource locator, which identifies the media source, to be sent to the second end user, and wherein the mobile device is configured to disconnect the session for the second end user such that a new video encryption key is negotiated amongst the remaining end users of the virtual talk group.

8. The logic of claim 7, wherein a secure data channel is established between the mobile device and a server, and wherein a Hypertext Transfer Protocol Secure (HTTPS) protocol is used to establish the secure data channel.

9. The logic of claim 7, wherein a control channel for the session is established between the mobile device and a server, the control channel being configured to manage data being sent to end users in the virtual talk group, and wherein media being delivered to the first end user can be passed to a mobile device being used by the second end user.

10. The logic of claim 7, wherein the operations further comprise:
proxying the data to be sent to the second end user such that the mobile device operates as a passthrough data gateway for the second end user during the session.

11. The logic of claim 7, wherein access to the data in the session is determined by an attribute set in a call set-up signaling header, or determined by a dual-tone multi-frequency (DTMF) command signal.

12. An apparatus, comprising:
a memory element configured to store data,
a processor operable to execute instructions associated with the data, and
a response module resident in a mobile device and configured to:
establish a session involving a first end user, wherein the first end user is included in a virtual talk group, which includes at least one other end user, and wherein a media source is provided for the session; and
initiate a request for a second end user to join the session, wherein the second end user is added to the virtual talk group, and wherein the mobile device is further configured to control which data from the media source is to be sent to the second user during the session, and wherein an internet protocol (IP) address associated with the media source is withheld from communications sent to the second end user;
wherein the session includes video data sent to the second end user without requiring a uniform resource locator, which identifies the media source, to be sent to the second end user, and wherein the mobile device is configured to disconnect the session for the second end user such that a new video encryption key is negotiated amongst the remaining end users of the virtual talk group.

13. The apparatus of claim 12, wherein a secure data channel is established between the mobile device and a server, and wherein a Hypertext Transfer Protocol Secure (HTTPS) protocol is used to establish the secure data channel.

14. The apparatus of claim 12, wherein a control channel for the session is established between the mobile device and a server, the control channel being configured to manage data being sent to end users in the virtual talk group, and wherein media being delivered to the first end user can be passed to a mobile device being used by the second end user.

15. The apparatus of claim 12, wherein the mobile device is configured to:
proxy the data to be sent to the second end user such that the mobile device operates as a passthrough data gateway for the second end user during the session.

16. The apparatus of claim 12, wherein the mobile device is configured to:
filter the data to be sent to the second end user such that specific types of data are sent to the second end user, the session including text data, audio data and video data, and wherein a length of time is configured for the second end user's access to the session.

17. The apparatus of claim 12, wherein access to the data in the session is determined by an attribute set in a call set-up signaling header, or determined by a dual-tone multi-frequency (DTMF) command signal.

* * * * *